J. CURRAN.
PIPE-CUTTER.
No. 182,900.
Patented Oct. 3, 1876.
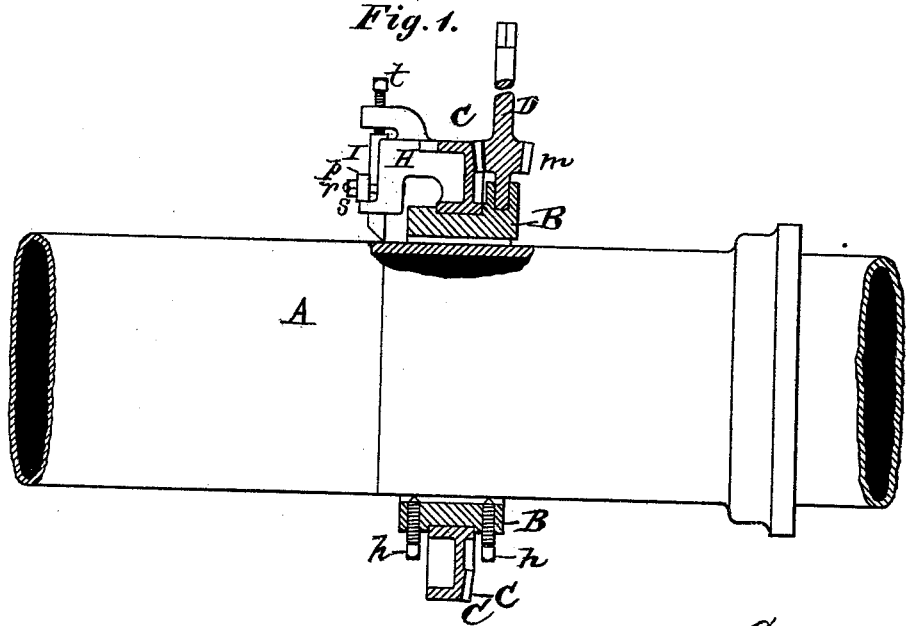
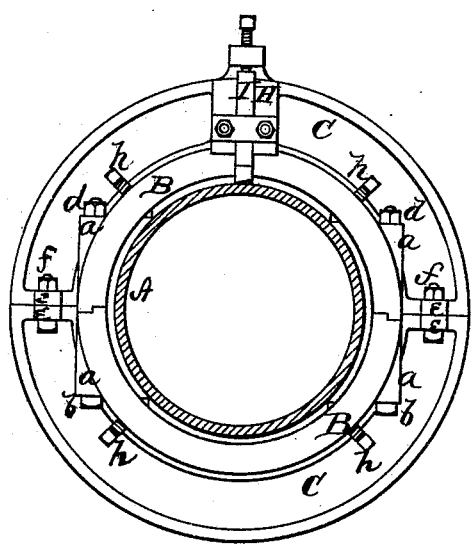
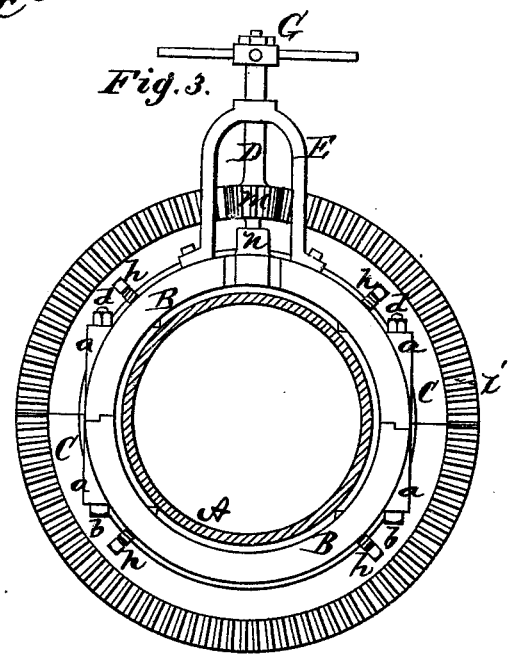
Witnesses:
Henry N. Miller
Franck L. Durand
Inventor:
James Curran
Alexander Mason
Atty

UNITED STATES PATENT OFFICE.

JAMES CURRAN, OF BALTIMORE, MARYLAND.

IMPROVEMENT IN PIPE-CUTTERS.

Specification forming part of Letters Patent No. 182,900, dated October 3, 1876; application filed August 18, 1876.

*To all whom it may concern:*

Be it known that I, JAMES CURRAN, of Baltimore city, in the county of Baltimore, and in the State of Maryland, have invented certain new and useful Improvements in a Tool for Cutting Cast-Iron Pipe; and do hereby declare that the following is a full, clear, and exact description thereof, reference being had to the accompanying drawings, and to the letters of reference marked thereon, making a part of this specification.

The nature of my invention consists in the construction and arrangement of a pipe or tube cutter, as will be hereinafter more fully set forth.

In order to enable others skilled in the art to which my invention appertains to make and use the same, I will now proceed to describe its construction and operation, referring to the annexed drawing, in which—

Figure 1 shows a section of a water-main with my cutting device in section placed thereon. Figs. 2 and 3 are two side views of the same.

A represents a cast-iron water-main, on which is placed a collar, B B. This collar is of larger inside diameter than the exterior diameter of the main A, and is made in two equal parts, and is also formed with a central circumferential groove, as shown. On each side of this groove and at the ends of the two parts B B are formed tubular projections $a$ $a$, and through the corresponding tubes on each side are passed long bolts $b$, and nuts $d$ are then screwed upon their ends, whereby the two parts of the collar are united together around the main. The collar is, however, loose, and can be adjusted at any point desired, and fastened by means of pointed set-screws $h$ $h$ passing through the collar on each side of the circumferential groove, as shown. In this groove on the collar is placed a wheel, also made in two parts, $c$ $c$, and united together by means of bolts $f$ passing through flanges $e$ $e$ on one side at the ends thereof. On one side this wheel is formed with a circle of beveled cogs, $i$, as shown in Fig. 3. This wheel is rotated by means of a pinion, $m$, secured upon a spindle or shaft, D, the lower end of which rests in a step, $n$, on the side of the collar. The shaft D has another bearing in a frame, E, secured to the collar; and said shaft may extend any desired distance up, and is at its upper end provided with a hand-wheel, G, for turning the same, and thus rotating the wheel C. On the opposite side of the wheel C is formed or attached a head, H, in which the cutter I is placed, said cutter being held down by means of a plate, $p$, placed upon two screws, $r$, and fastened by nuts $s$ $s$. The cutter is adjusted by means of a set-screw, $t$, as shown. By rotating the shaft D the wheel C will be turned around the collar, and by means of the set-screw $t$ the cutter I is fed, when required, so as to cut the pipe.

My invention is intended solely for cutting the large pipes or mains that are usually buried about three feet in the ground. The object is to cut out a portion of the main to allow the attachment of another pipe, to lead at right angles to the same.

In using my invention, a trench is made at each side and under the main. One portion of the bisected sleeve is first placed around one side of the pipe. Then the other section is placed around the other side, and the two are then bolted together at the top. The two parts of the sleeve are then rotated around the pipe, and the other ends bolted together. The operating-shaft is long enough so as to extend above the surface of the earth. To the end of this shaft is attached a hand wheel or wrench, so that by turning the same the cutter is caused to travel around and cut the pipe.

I am aware that devices are known for cutting small pipe in which a two-part sleeve is hinged together, and in which the cutting-tool is rotated by a ratchet-lever. I do not claim such to be my invention, as the same could not be made to operate for the purposes designed by me. Upon the work I design to use my invention the parts must be very large and heavy, and in case the parts of the sleeve were hinged together, it would be so weighty and cumbersome that it could not be practically handled or secured around the main. A ratchet could not well be used for rotating the cutter, inasmuch as the handle could only be moved so far as the pipe is buried in the ground, and the handle would strike the surface of the earth, thus preventing a continuous rotation around the pipe. I deem that a ratchet would be entirely impracticable for my purposes, because the power required to cut large mains could not be had with such.

I do not desire to be understood as claiming the use of gearing for operating a cutting-tool, except in connection with the other features of my invention heretofore described.

Having thus fully described my invention, what I claim as new, and desire to secure by Letters Patent, is—

In a device for cutting pipes, the combination of the collar B, formed of two independent and detachable pieces bolted together at each of their ends, and provided with pointed set-screws $h$, the wheel C, composed of two independent and detachable parts, having beveled cogs $i$ on one side, the head H, provided with adjustable cutter I, the pinion $m$, and shaft D, all constructed substantially as and for the purposes herein set forth.

In testimony that I claim the foregoing I have hereunto set my hand this 10th day of August, 1876.

JAMES CURRAN.

Witnesses:
WILLIAM L. BRAMHALL,
C. M. ALEXANDER.